United States Patent
Eder et al.

(10) Patent No.: US 10,949,216 B2
(45) Date of Patent: Mar. 16, 2021

(54) SUPPORT FOR THIRD-PARTY KERNEL MODULES ON HOST OPERATING SYSTEMS

(71) Applicant: Red Hat, Inc., Raleigh, NC (US)

(72) Inventors: Jeremy John Eder, Raleigh, NC (US); Marko Zvonko Kaiser, Grasbrunn (DE)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/443,540

(22) Filed: Jun. 17, 2019

(65) Prior Publication Data

US 2020/0394049 A1 Dec. 17, 2020

(51) Int. Cl.

| | |
|---|---|
| G06F 9/44 | (2018.01) |
| G06F 9/4401 | (2018.01) |
| G06F 16/11 | (2019.01) |
| G06T 1/20 | (2006.01) |
| G06F 9/54 | (2006.01) |
| G06F 9/455 | (2018.01) |

(52) U.S. Cl.
CPC ........ *G06F 9/4411* (2013.01); *G06F 9/45558* (2013.01); *G06F 9/545* (2013.01); *G06F 16/11* (2019.01); *G06T 1/20* (2013.01); *G06F 2009/45583* (2013.01); *G06F 2009/45595* (2013.01)

(58) Field of Classification Search
CPC .................................................... G06F 9/4411
USPC ....................................................... 719/321
See application file for complete search history.

(56) References Cited

U.S. PATENT DOCUMENTS

| | | |
|---|---|---|
| 1,021,652 A1 | 2/2019 | Pavel et al. |
| 2013/0036431 A1* | 2/2013 | Douceur .................. G06F 21/53 719/327 |
| 2017/0346792 A1 | 11/2017 | Nataros et al. |
| 2018/0293700 A1* | 10/2018 | Tian ......................... G06F 9/455 |

OTHER PUBLICATIONS

*Add Kernel Modules*, 2019, Intel Corporation, 7pgs, https://clearlinux.org/documentation/clear-linux/guides/maintenance/kernel-modules.
*Include Out-of-tree Kernel Modules in Docker for Mac*, Feb. 5, 2019, fortuneenergy's diary, https://fortuneenergy.hatenablog.com/entry/2019/02/05/104959.
Jesse Brandeburg, *Linux Plumbers Conf 2010*, 2010, Senior Linux developer in the Intel LAN Access Division.

(Continued)

*Primary Examiner* — Timothy A Mudrick
(74) *Attorney, Agent, or Firm* — Haynes and Boone, LLP (57) ABSTRACT

An example method of running an application workload includes detecting a request from a client for a hardware element for executing a workload of an application, the hardware element using a kernel driver to communicate with a host operating system and being abstracted by a node running on the host operating system. The method also includes creating a container on the node. The method further includes allocating the hardware element for the workload to execute in the container. The method also includes loading, by the container, the kernel driver into the host operating system. The method further includes running, by the container, the workload inside the container using the hardware element.

20 Claims, 5 Drawing Sheets

(56) References Cited

OTHER PUBLICATIONS

Chris Simmonds, *Embedded Linux Device Drivers: Writing a Kernel Device Driver*, Aug. 14, 2018, https://www.embedded.com/print/4460980.

Dodji Seketeli, *Analyzing Changes to the Binary Interface Between the Linux Kernel and its Modules*, Mar. 28, 2018, Red Hat, Inc., https://developers.redhat.com/blog/2018/03/28/analyzing-binary-interface-changes-linux-kernel/.

* cited by examiner

SUPPORT FOR THIRD-PARTY KERNEL MODULES ON HOST OPERATING SYSTEMS

BACKGROUND

The present disclosure generally relates to computing devices, and more particularly to providing support for third-party kernel drivers on host operating systems.

A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine.

BRIEF SUMMARY

Methods, systems, and techniques for providing support for third-party kernel drivers are provided.

An example method of running an application workload includes detecting a request from a client for a hardware element for executing a workload of an application, the hardware element using a kernel driver to communicate with a host operating system and being abstracted by a node running on the host operating system. The method also includes creating a container on the node. The method further includes allocating the hardware element for the workload to execute in the container. The method also includes loading, by the container, the kernel driver into the host operating system. The method further includes running, by the container, the workload inside the container using the hardware element.

An example system for running an application workload includes a kernel driver support system that detects a request from a client for a hardware element for executing a workload of an application. The hardware element uses a kernel driver to communicate with a host operating system and is abstracted by a node running on the host operating system. The system also includes an orchestrator that creates a main container on the node and allocates the hardware element on which the workload executes. The system further includes a privileged container that loads the kernel driver into the host operating system, wherein the privileged container runs inside the main container. The system also includes a workload container that runs the workload inside the workload container using the hardware element, wherein the workload container runs inside the main container.

An example machine-readable medium includes a plurality of machine-readable instructions that when executed by one or more processors is adapted to cause the one or more processors to perform a method including: detecting a request from a client for a hardware element for executing a workload of an application, the hardware element using a kernel driver to communicate with a host operating system and being abstracted by a node running on the host operating system; creating a container on the node; allocating the hardware element for the workload to execute in the container; loading, by the container, the kernel driver into the host operating system; and running, by the container, the workload inside the container using the hardware element.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A container is an isolated processing space that can exist on top of a virtual machine or on top of actual hardware. The container may be viewed as a lightweight virtual machine that is used to create environments and may share the operating system with the host machine, preserving resources. In an example, a container may offer software that creates virtual environments mimicking a full virtual machine. A container platform may be a container-based cloud service that connects different computer systems together. A container may be created on a node that abstracts hardware corresponding to the node. Reference to a node including hardware may refer to hardware that is abstracted by the node. A user may deploy an application on the container platform.

The technology industry is trending towards native operating systems, and users may make heavy use of hardware accelerators (e.g., graphics processing unit (GPU)) and other cutting-edge devices that are not supported by an out-of-the-box operating system. A host machine may include a kernel having one or more kernel modules. A kernel module may be, for example, a kernel driver that interfaces with a hardware element. A hardware element may be a hardware accelerator (e.g., graphics processing unit GPU)), and a third party may provide a kernel driver for the hardware accelerator. The host machine may include a host operating system (e.g., a container-based operating system or a non-container-based operating system) on which containers may run.

Installation of a kernel module in the host operating system may involve writing files to the host machine. In a container-based operating system, any features added to the distribution that are not part of the out-of-the-box operating system are typically delivered via a container. A third-party kernel driver may be a driver that is not originally provided in the host operating system. On a containerized operating system, components that are added to the distribution and not part of the immutable set are delivered via a container. The term "containerized operating system" may be used interchangeably with the term "container-based operating system." Although the operating system may be described as being a containerized operating system, it should also be understood that the operating system may be a non-containerized operating system. The term "non-containerized operating system" may be used interchangeably with the term "non-container-based operating system." A user may be unable to install a third-party kernel driver on a container-based operating system because the host machine has an immutable file system that does not allow file installations on the operating system. Accordingly, it may be difficult to compile and/or load a kernel module (e.g., a kernel driver) into the operating system.

A solution to the problem of loading third-party kernel modules into a host operating system may involve using a container to load the kernel module. It may be desirable to download a third-party kernel driver that has not yet been loaded into a host operating system, compile the kernel driver if in source code format, and/or load the kernel driver into the host operating system. Without the appropriate kernel driver for the hardware element loaded into the host operating system, the computer system may be unable to use the hardware element. In an example, the company that provides the hardware element (e.g., GPU) for the application use in the cloud may be unable to distribute the kernel driver for licensing because the kernel driver is a closed driver (unlicensed driver).

By using the teachings provided in the present disclosure, a user may more easily consume hardware elements (e.g., GPU, NIC, etc.) if third-party kernel drivers for the hardware elements are available. Accordingly, it may be unnecessary to pre-load a kernel driver in each host operating system on which a node in the system runs. Additionally, managing kernel modules on a system typically involves having privileged rights, and it may be undesirable for users to be able to alter the system directly. In the present disclosure, users may use the hardware element for execution of the application, without having privileged access to the host machine. For example, it may be unnecessary for the user to have administrative or elevated privileges to load the kernel driver into the host operating system. Components discussed in the system may increase security by offloading privileged tasks to an orchestrator.

An example system for running an application workload includes a kernel driver support system that detects a request from a client for a hardware element for executing a workload of an application. The hardware element uses a kernel driver to communicate with a host operating system and is abstracted by a node running on the host operating system. The system also includes an orchestrator that creates a main container on the node and allocates the hardware element on which the workload executes. The system further includes a privileged container that loads the kernel driver into the host operating system, wherein the privileged container runs inside the main container. The system also includes a workload container that runs the workload inside the workload container using the hardware element, wherein the workload container runs inside the main container.

The present disclosure provides techniques for creating an application stack. Unless specifically stated otherwise, as apparent from the following discussion, it is appreciated that throughout the description, discussions utilizing terms such as "determining," "storing," "creating," "receiving," "sending," "running," "executing," "compiling," "installing," "detecting," "allocating," "loading," "retrieving," "fetching," "generating," "pushing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
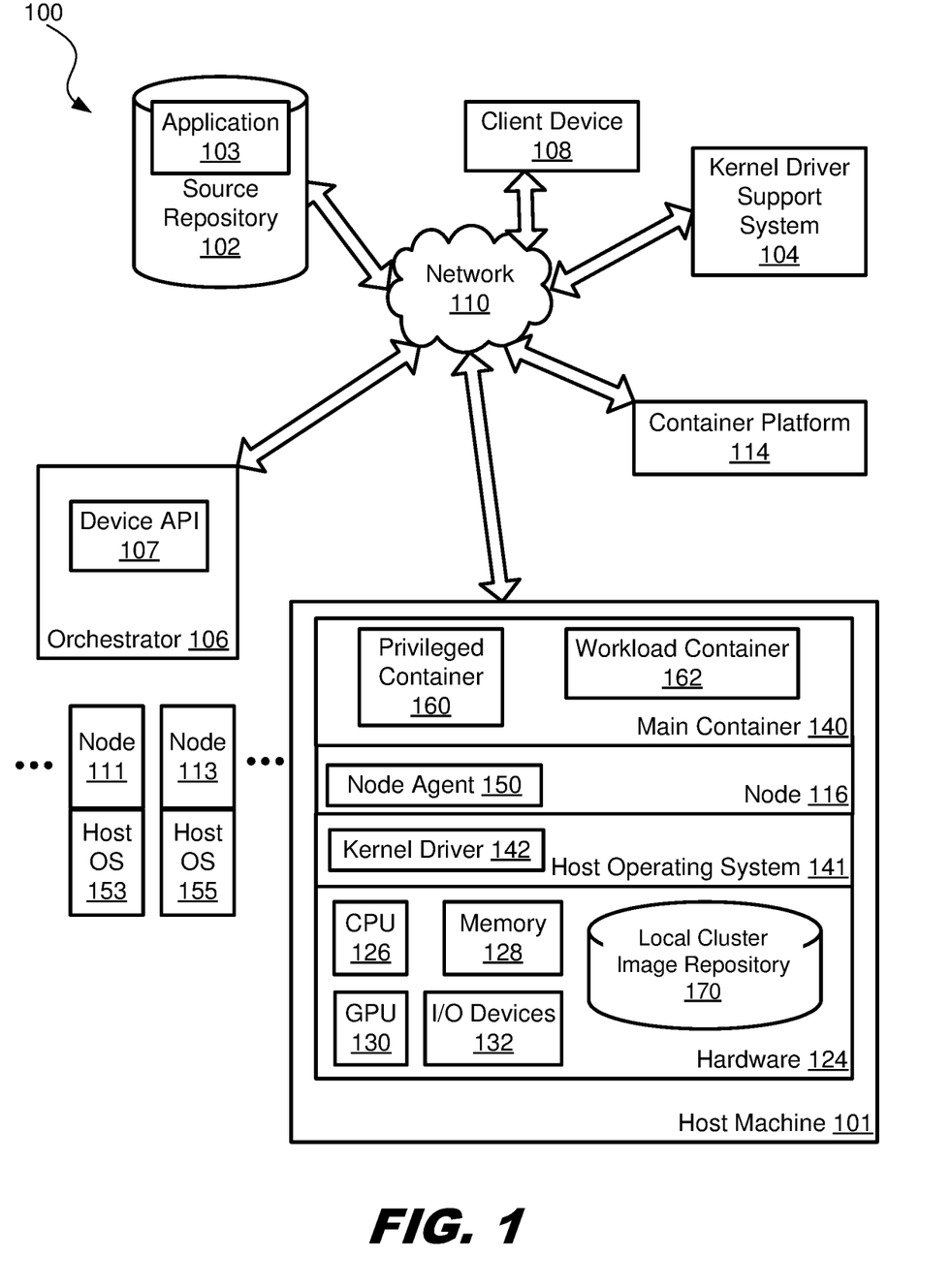
FIG. 1 is a diagram illustrating an example system for loading a kernel driver into a host operating system.

FIG. 1 is a diagram illustrating an example system 100 for loading a kernel driver into a host operating system. The system 100 includes a host machine 101, a source repository 102, a kernel driver support system 104, an orchestrator 106, a client device 108, and a container platform 114 coupled over a network 110. The network 110 may be a private network (e.g., local area network (LAN), wide area network (WAN), intranet, etc.), a public network (e.g., the Internet), or a combination thereof. The network 110 may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

The host machine 101 includes a host operating system 141. The host operating system 141 serves as a central component for facilitating communication between software application(s) (e.g., application 103) and hardware devices 124 of the host machine 101. The host operating system 141 may be responsible for facilitating operating system functions and various management tasks (e.g., process management, disk management, and memory management). For example, host operating system 141 manages, organizes, and keeps track of files stored on a computer system that runs the host operating system 141.

The source repository 102 may store code for an application 103 that is deployable on a computing device (e.g., the host machine 101). The source repository 102 may be a repository hosting service that stores source code of one or more applications 103. In an example, the source repository 102 is GITHUB®. Execution of application 103 may involve executing at least one portion of code using a given hardware element (e.g., graphics processing unit (GPU), network interface card (NIC), etc.).

A user may want to deploy the application 103 stored in the source repository 102. The client device 108 may send a request for the application 103 to be run on the container platform 114. The client device 108 may be, for example, a personal computer, a server, a game console, a set-top box, a kiosk, an embedded system, a workstation, a mobile device (e.g., a mobile phone, a personal digital assistant, a tablet, and a laptop), or other device having at least one processor and memory. The container platform 114 may be a container-based cloud service that connects different computer systems together. The container platform 114 may be installed on multiple physical hardware, and each application executing on the container platform 114 may run inside a container. The container platform 114 may operate at the operating-system level, and a plurality of nodes 111, 113, and 116 may run on the container platform 114. The node 111 runs on a host operating system 153, the node 113 runs on a host operating system 155, and the node 116 runs on the host operating system 141.

The orchestrator 106 may receive the user's request to deploy the application 103. Before the application 103 is deployed, the orchestrator 106 creates a main container 140 on a node 116 running on the container platform 114. A node may provide an environment in which one or more containers may be deployed. The main container 140 may include one or more containers. A container may include an entire runtime environment: an application, plus all its dependencies, libraries and other binaries, and configuration files to run it, bundled into one package. A container may run one or more applications on the local host, on physical or virtual machines in a data center, or in the cloud. Additionally, the main container 140 and the host machine 101 may share the same kernel.

The node 116 may be software running on top of the host operating system 141. In an example, the container platform 114 exposes a deploy service (not shown) that may interact with the client device 108 via a user interface (UI). The deploy service may send instructions to the client device 108 that cause the client device 108 to display a deploy button that is visible to the user. The user may request that the application 103 be deployed via the client device 108 by selecting the deploy button on the UI of the container platform 114. In response to receiving an indication that the user has selected the deploy button, the orchestrator 106 selects the node 116 from the plurality of nodes 111, 113, 116, etc. and creates the main container 140 on the selected node 116. The main container 140 may include one or more containers and runs on the node 116. In an example, the container platform 114 is OPENSHIFT®, and the main container 140 is a POD®.

The node 116 provides an abstraction of hardware 124, which includes a central processing unit (CPU) 126, a memory 128, and a graphics processing unit (GPU) 130. The hardware 124 may include other I/O devices 132 (e.g., a network interface card). The hardware 124 includes one or more CPUs 126 for executing software (e.g., machine-readable instructions) and using or updating data stored in the memory 128. The "CPU" may also be referred to as a "central processing unit," a "processor," or "physical processor" herein. A CPU shall refer to a device capable of executing instructions encoding arithmetic, logical, or input/output (I/O) operations. In an example, the CPU 126 may follow the Von Neumann architectural model and may include an arithmetic logic unit (ALU), a control unit, and a plurality of registers. In a further aspect, a CPU may be a single-core processor that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

The memory 128 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid-state drives typically have relatively larger storage volume but relatively slower performance. Other types of memory, such as those used for RAM, are optimized for speed and may be referred to as "working memory." The various types of memory may store information in the form of software and data.

The hardware 124 also includes a local cluster image repository 170 that may store kernel modules. In an example, a container running on the host operating system 141 pushes a kernel module (e.g., a kernel driver) into the local cluster image repository 170 for retrieval at a later point in time.

The kernel driver support system 104, the orchestrator 106, and the node agent 150 may run the orchestration control plane. One or more orchestrators may run on one or more control plane nodes. Additionally, a node agent runs on a node different from a control plane node on which an orchestrator runs. The kernel driver support system 104 may detect a request from the client device 108 for a hardware element for executing a workload of the application 103. In an example, the hardware element is a GPU. To run properly, portions of the application 103 are run on the hardware element, which may use a kernel driver to communicate with the host operating system 141. The kernel driver support system 104 may send a communication to the orchestrator 106. The communication may include information such as the application 103 to be executed, the requesting client device 108, the requested hardware element, among other information. As discussed, the orchestrator 106 may receive the communication and select the node 116 from the plurality of nodes 111, 113, 116, etc., where the selected node 116 has the hardware element installed. The orchestrator 106 may filter through the plurality of nodes 111, 113, and 116 to identify which nodes have the requested hardware element installed. A node has a hardware element installed if the node runs on a host operating system that interacts with the hardware element.

The orchestrator 106 creates the main container 140 on the selected node 116. The orchestrator 106 may create a privileged container 160 and a workload container 162 inside the main container 140. A workload container may refer to a container in which at least a portion of the application 103 runs. A privileged container may refer to a container that has privileged access to the host machine 101 (e.g., a root user on a LINUX® system). In an example, the privileged container 160 may have privileges to alter the network coupled to the host machine 101, access devices coupled to the host machine 101, load kernel modules (e.g., kernel drivers) into the host operating system 141, etc.

The node 116 includes a node agent 150 that sends a request to the orchestrator 106 to allocate the hardware element for the client device 108 to execute application 103. In an example, the orchestrator 106 exposes a device application programming interface (API) 107 that when invoked, allocates the hardware element for the application 103. In an example, the node agent 150 invokes the device API 107 associated with the GPU 130. In response to invocation of the device API 107 by the node agent 150, the orchestrator 106 may allocate the hardware element (e.g., the GPU 130) for the application workload to execute in the main container 140.

A node agent may run on each node in the system 100 and may create containers and allocate hardware elements with the orchestrator 106's cooperation. A node agent has a single-node scope, and the orchestrator 106 has a full system-wide scope. The system 100 may include hundreds or thousands of nodes. In an example, the host machine 101 may be an immutable host, and the file system in the host machine 101 may be immutable and read-only. Additionally, the host operating system 141 may be a container-based operating system or a non-container-based operating system. The host operating system 141 may be designed to allow containers to run, without allowing for kernel modules to be installed on the host by an entity other than a container. The loading of kernel modules (e.g., kernel drivers) into the host operating system 141 may involve writing files to the host. Accordingly, installing out-of-tree kernel modules on the host operating system 141 may be difficult due to the immutability of the host.

In an example, the kernel driver support system 104 or the node agent 150 sends a request to the privileged container 160 to create the kernel driver 142 for the GPU 130 and/or load the kernel driver 142 into the host operating system 141. In response to receiving the request, the privileged container 160 identifies the correct kernel driver 142 for the GPU 130 and loads the kernel driver 142 into the host operating system 141. In an example, the privileged container 160 may compile the kernel driver 142 before loading the compiled kernel driver 142 into the host operating system 141. The privileged container 160 may determine, based on the model of the GPU 130 and the version of the host operating system 141, the correct version of the kernel driver 142 for loading into the host operating system 141. The privileged container 160 may ensure that execution of the application 103 is kept on a supported path regarding what has been validated as compatible with the version of the host operating system 141.

After the privileged container 160 loads the kernel driver 142 into the host operating system 141, the hardware element that interacts with the kernel driver 142 may be used for executing at least a portion of the application workload. In an example, the workload container 162 may execute at least a portion of the application workload on the GPU 130. After the workload container 162 has completed execution of the portion of the application workload on the GPU 130, the workload container 162 may exit. After the workload container 162 exits, the privileged container 160 may unload the kernel driver 142 or may alternatively, leave the kernel driver 142 loaded in the host operating system 141 for future use. The creation and/or loading of the kernel driver 142 into the host operating system 141 may be opaque to the user and/or cluster administrator. In some examples, the privileged container 160 pushes the kernel driver 142 into the local cluster image repository 170 coupled to the host operating system 141.

By using the teachings provided in the present disclosure, a user may more easily consume hardware elements (e.g., GPU, NIC, etc.) if third-party kernel drivers for the hardware elements are available. A third-party kernel driver may be a driver that is not originally provide in the host operating system 141. The privileged container 160 may utilize the primitives (e.g., builds, configuration maps, etc.) in the container platform 114 to enable the appropriate operations to be performed to build and load the kernel driver 142. Additionally, the system 100 may include heterogeneous environments including a variety of kernel versions, kernel driver versions, different models of the same hardware element (e.g., GPU), etc. For example, the system 100 may include heterogeneous clusters having some nodes that have GPUs installed (e.g., different GPU models) and some nodes that do not have GPUs installed. Although the system 100 may include heterogeneous environments, the privileged container 160 may ensure that a compatible kernel driver is loaded into the host operating system 141.

Further, it may be unnecessary to pre-load a kernel driver in each host operating system on which a node in the system runs. For example, the orchestrator 106 may create a privileged container inside a main container, and the privileged container may load a given kernel driver for use by a hardware element into the appropriate host operating systems prior to executing the application 103 or other applications that use the hardware element. Furthermore, it may be unnecessary for the user to have administrative or elevated privileges to load the kernel driver 142. For example, a user without administrative or elevated privileges may send a request to execute application 103, where the request further causes a container to load the kernel driver 142 into the host operating system 141.

Components discussed in the system 100 (e.g., kernel driver support system 104, orchestrator 106, container platform 114, privileged container 160, the workload container 162, and/or the node agent 150) may increase security by offloading privileged tasks to the orchestrator 106. For example, managing kernel modules on a system typically involves having privileged rights, and it may be undesirable for users to be able to alter the system directly. In the present disclosure, users may use the hardware element for execution of the application 103, without having privileged access to the host machine 101.

Figure 2:
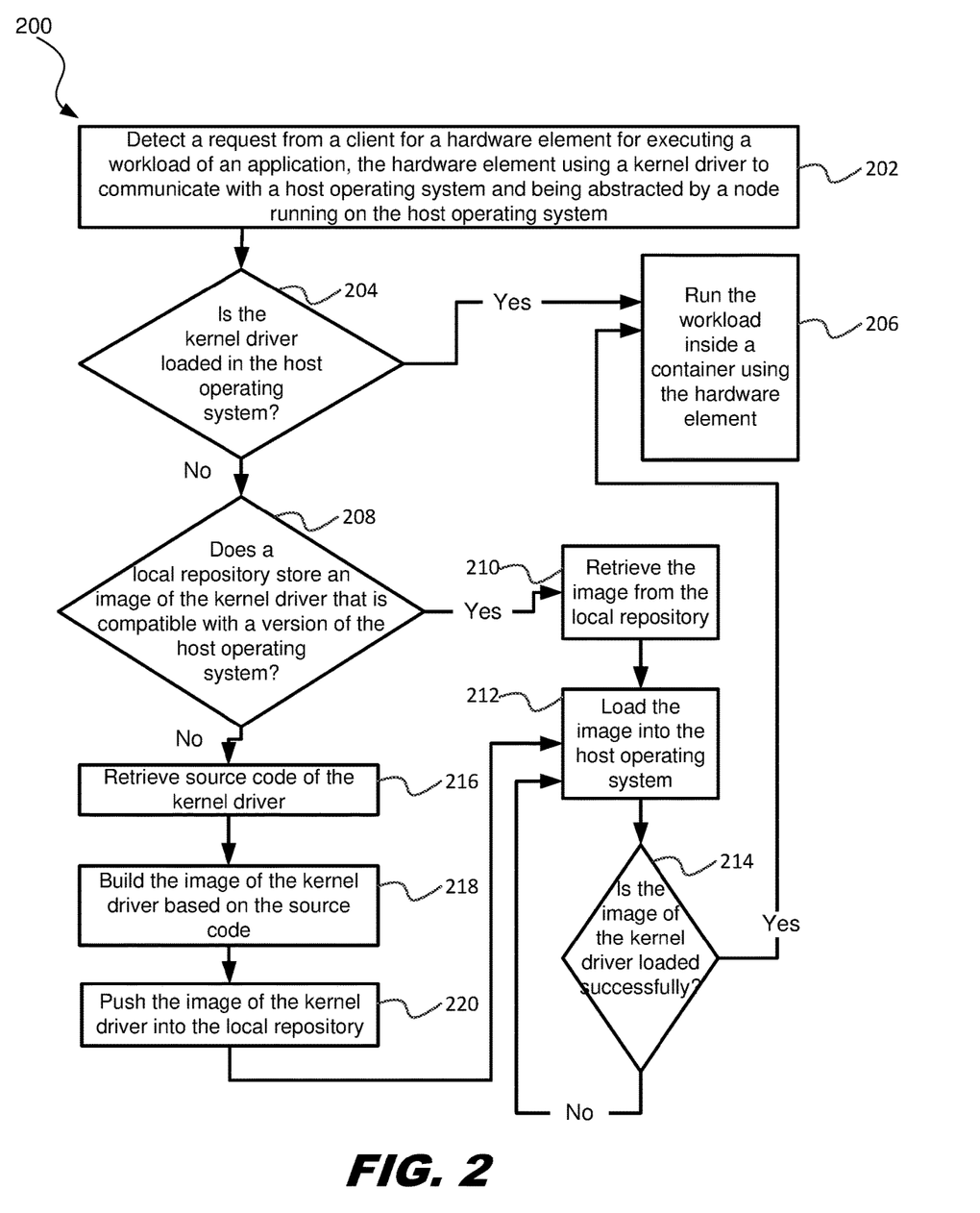
FIG. 2 is a flowchart illustrating an example method of running an application workload on a hardware element.

FIG. 2 is a flowchart illustrating an example method 200 of running an application workload on a hardware element. Blocks of the method 200 can be executed by a computing device (e.g., a processor, processing circuit, and/or other suitable component) or other suitable means for executing or performing the blocks. For example, a container platform, a node, or a main container running on the node, may utilize one or more components, such as the CPU 126, the memory 128, the GPU 130, or other I/O devices 132 to execute the blocks of method 200. As illustrated, the method 200 includes a number of enumerated blocks, but examples of the method 200 may include additional blocks before, after, and in between the enumerated blocks. In some examples, one or more of the enumerated blocks may be omitted or performed in a different order.

At block 202, the method 200 includes detecting a request from a client for a hardware element for executing a workload of an application, the hardware element using a kernel driver to communicate with a host operating system and being abstracted by a node running on the host operating system.

At block 204, the method 200 includes determining whether the kernel driver is loaded in the host operating system. If it is determined that the kernel driver is loaded in the host operating system, process flow proceeds from block 204 to block 206. At block 206, the method 200 includes running the workload inside a container using the hardware element. If it is determined that the kernel driver is not loaded in the host operating system, process flow proceeds from block 204 to block 208. At block 208, the method 200 includes determining whether a local repository stores an image of the kernel driver that is compatible with a version of the host operating system. If the local repository stores the appropriate image of the kernel driver, the privileged container 160 may use the image stored in the local repository to save time and compute resources.

If it is determined that the local repository stores an image of the kernel driver that is compatible with the version of the host operating system, process flow proceeds from block 208 to block 210. At block 210, the method 200 includes retrieving the image from the local repository. At block 212, the method 200 includes loading the image into the host operating system. The privileged container 160 may load the image of the kernel driver into the host operating system 141 without violating any licenses. In an example, the privileged container 160 invokes a system call into the host operating system 141 to load the kernel driver 142 into the host operating system 141.

At block 214, the method 200 includes determining whether the image of the kernel driver is loaded successfully. If is it determined that the image of the kernel driver is loaded successfully, process flow proceeds from block 214 to block 206. If it is determined that the image of the kernel driver is not loaded successfully, process flow proceeds from block 214 to block 212. In an example, the node agent 150 may keep track of a count indicating the number of retries for loading the image into the host operating system. If the count is greater than a count threshold, the node agent 150 may send an error message to the client device 108, the error message indicating that a problem has occurred in loading the image of the kernel driver into the host operating system 141. Reference to an image of a kernel driver being loaded into a host operating system may also refer to the kernel driver being loaded into the host operating system.

If it is determined that the local repository does not store an image of the kernel driver that is compatible with the version of the host operating system, process flow proceeds from block 208 to block 216. At block 216, the method 200 includes retrieving source code of the kernel driver. In an example, the privileged container 160 downloads the source code of the kernel driver 142. The entity that provides the GPU 130 and/or the kernel driver 142 may provide a configuration map specifying the name of the kernel driver 142 and indicating a location at which the source code of the kernel driver 142 is stored. The configuration map may include a pointer to the location where the privileged container 160 may fetch the source code. The privileged container 160 may search the configuration map for the name of the kernel driver 142 and identify, based on the matching name and the reference to the source code in the configuration map, where the source code is located. The location may be an external data repository. The privileged container 160 may send a request to the external data repository for the source code and download the kernel driver 142 from the external data repository.

At block 218, the method 200 includes building the image of the kernel driver based on the source code. In an example, the node agent 150 downloads the source code of the kernel driver 142 into the main container 140 and compiles the source code into binary code. At block 220, the method 200 includes pushing the image of the kernel driver into the local repository. Process flow proceeds from block 220 to block 212.

It is understood that additional blocks may be performed before, during, or after blocks 202-220 discussed above. For example, although block 216 provides for retrieving source code of the kernel driver, it should be understood that the privileged container 160 may retrieve binaries of the kernel driver that are already compiled. In this example, binaries may be pushed into the local repository as illustrated in block 220 and block 218 may be skipped.

Figure 3:
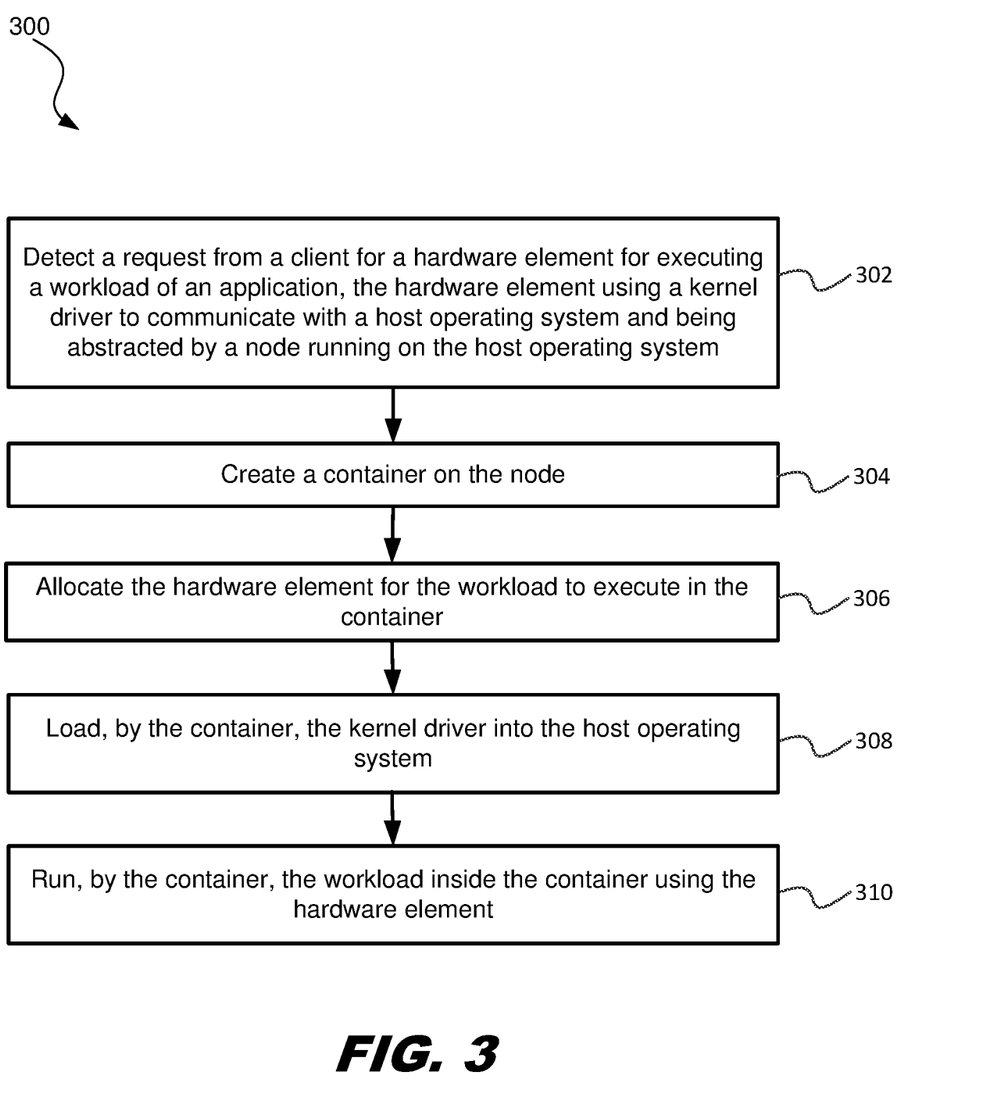
FIG. 3 is a flowchart illustrating an example method of running an application workload on a hardware element.

FIG. 3 is a flowchart illustrating an example method 300 of running an application workload on a hardware element. Blocks of the method 300 can be executed by a computing device (e.g., a processor, processing circuit, and/or other suitable component) or other suitable means for executing or performing the blocks. For example, a container platform, a node, or a main container running on the node, may utilize one or more components, such as the CPU 126, the memory 128, the GPU 130, or other I/O devices 132 to execute the blocks of method 300. As illustrated, the method 300 includes a number of enumerated blocks, but examples of the method 300 may include additional blocks before, after, and in between the enumerated blocks. In some examples, one or more of the enumerated blocks may be omitted or performed in a different order.

At block 302, the method 300 includes detecting a request from a client for a hardware element for executing a workload of an application, the hardware element using a kernel driver to communicate with a host operating system and being abstracted by a node running on the host operating system. In an example, the kernel driver support system 104 detects a request from the client device 108 for a GPU for executing a workload of the application 103, the GPU using the kernel driver 142 to communicate with the host operating system 141 and being abstracted by the node 116 running on the host operating system 141.

At block 304, the method 300 includes creating a container on the node. In an example, the privileged container 160 creates the main container 140 on the node 116, which has the GPU installed. At block 306, the method 300 includes allocating the hardware element for the workload to execute in the container. In an example, the orchestrator 106 allocates the hardware elements for the workload of the application 103 to execute in the workload container 162. At block 308, the method 300 includes loading, by the container, the kernel driver into the host operating system. In an example, the privileged container 160 loads the kernel driver 142 into the host operating system 141. At block 310, the method 300 includes running, by the container, the workload inside the container using the hardware element. In an example, the workload container 162 runs the workload on the GPU.

Figure 4:
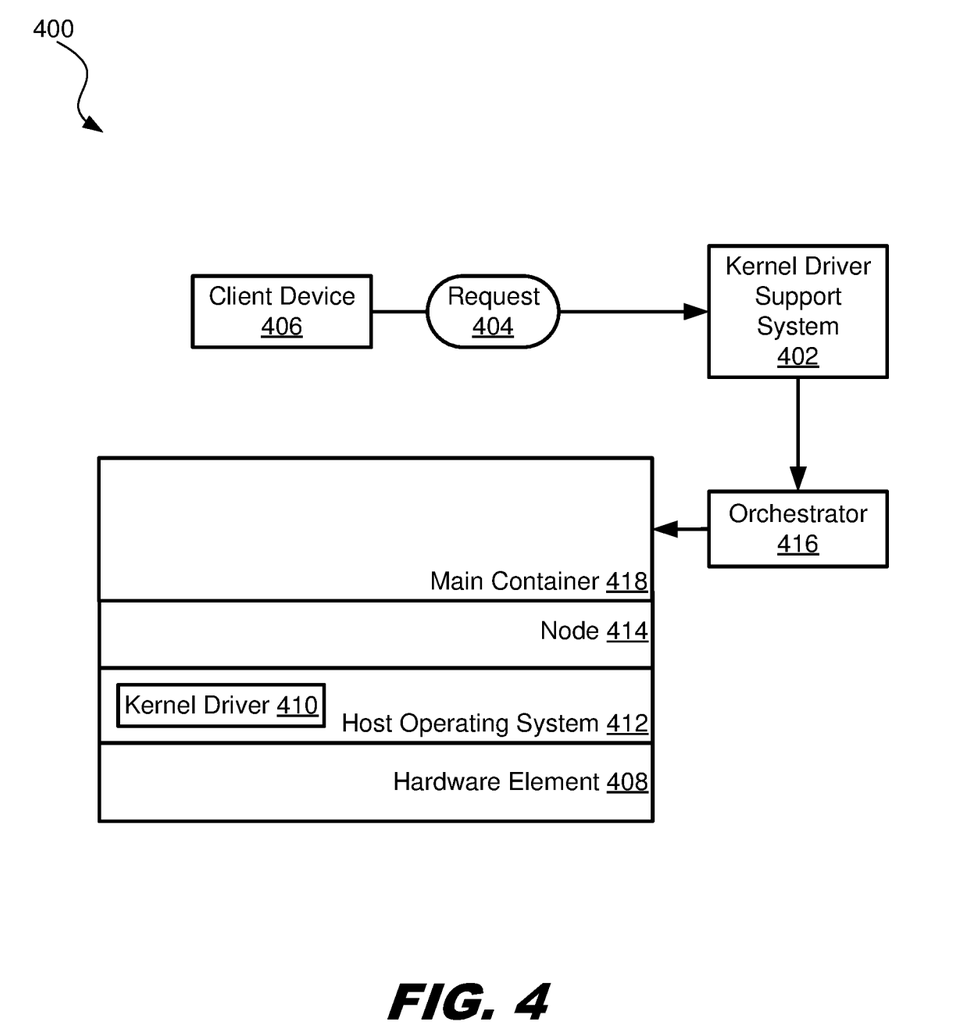
FIG. 4 is a block diagram illustrating an example system for running an application workload.

FIG. 4 is a block diagram illustrating an example system 400 for running an application workload. In FIG. 4, a kernel driver support system 402 detects a request 404 from a client device 406 for a hardware element 408 for executing a workload of an application. The hardware element 408 uses a kernel driver 410 to communicate with a host operating system 412 and being abstracted by a node 414 running on the host operating system 412. The kernel driver support system 402 may interact with an orchestrator 416 and the node 414 for loading of a kernel driver into the host operating system 412. The client device 406 may use the hardware element 408 for executing the application workload on the hardware element 408.

The orchestrator 416 creates a main container 418 on the node 414, which has the hardware element 408 and runs on the host operating system 412. Additionally, the orchestrator 416 allocates the hardware element 408 on which the workload executes. The main container 418 may load the kernel driver 410 into the host operating system 412. In an example, the privileged container 160 loads the kernel driver 410 into the host operating system 412. The main container 140 may run at least a portion of the workload inside the container using the hardware element 408. In an example, the workload container 162 runs at least the portion of the workload inside the workload container 162 using the hardware element 408.

As discussed above and further emphasized here, FIGS. 1-4 are merely examples, which should not unduly limit the scope of the claims.

Figure 5:
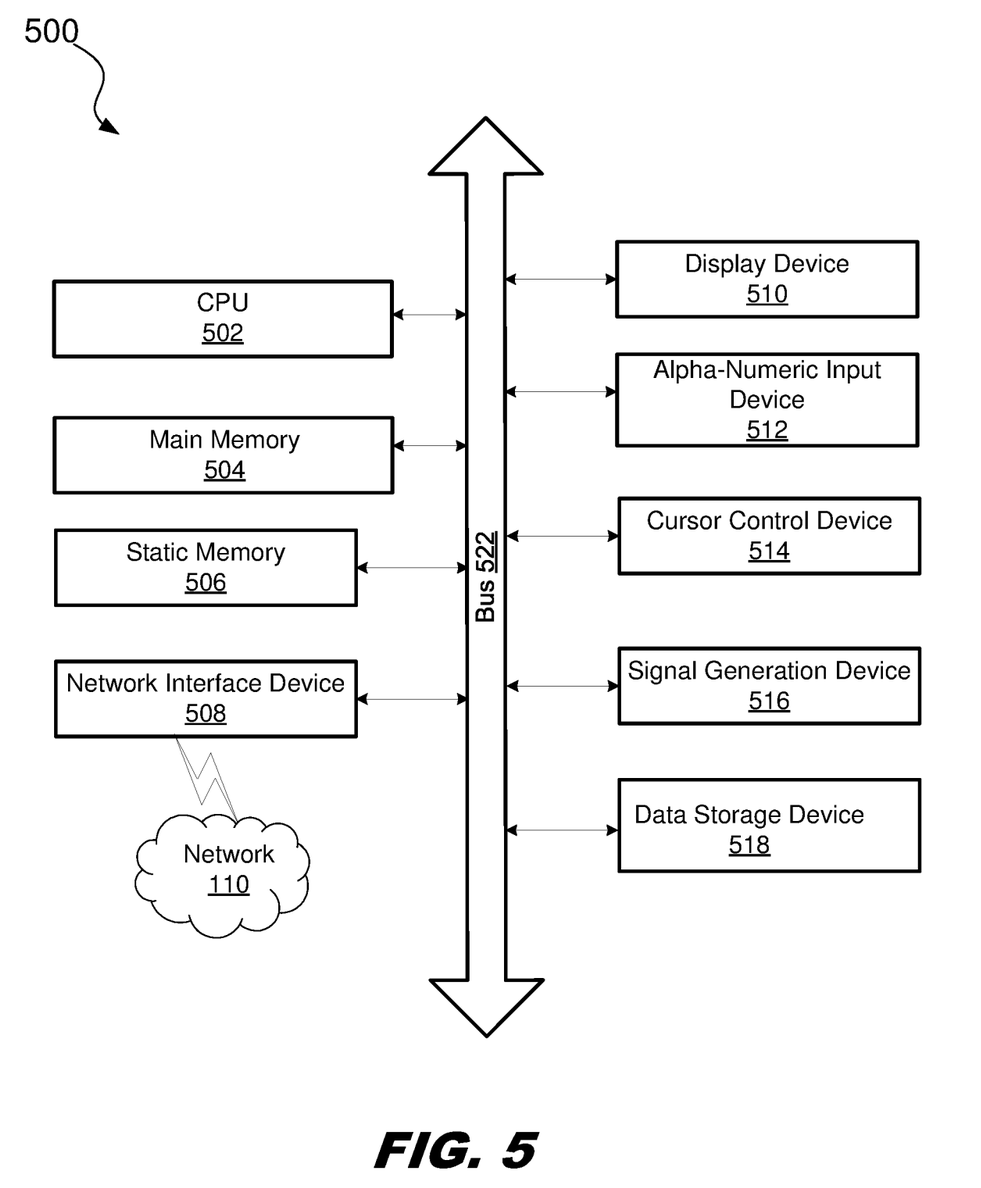
FIG. 5 is a block diagram of a computer system suitable for implementing one or more examples of the present disclosure.

FIG. 5 illustrates a system diagram of a machine 500 within which a set of instructions, for causing the machine to perform any one or more of the methodologies discussed herein, may be executed in the example form of a computer system coupled to the hardware 124, the node 116, the container platform 114, and/or the main container 140. The machine 500 may be connected (e.g., networked) to other machines in a local area network (LAN), an Intranet, an extranet, or the Internet. The machine 500 may operate in the capacity of a server or a client machine in a client-server network environment, or as a peer machine in a peer-to-peer (or distributed) network environment. The machine 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The machine 500 may correspond to the host machine 101, orchestrator 106, kernel driver support system 104, client device 108, etc.

In the present example, the machine 500 includes the CPU 502, main memory 504, static memory 506, and a data storage device 518, which communicate with each other via a bus 522. The CPU 502 represents one or more general-purpose processing devices such as a microprocessor, or the like. More particularly, the CPU 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The CPU 502 may also be one or more special-purpose processing devices such as an application specific integrated circuit (ASIC), a field programmable gate array (FPGA), a digital signal processor (DSP), a network processor, or the like. The CPU 502 is configured to execute instructions for performing the operations, actions, and steps discussed herein (e.g., the method 200 discussed in relation to FIG. 2, the method 300 discussed in relation to FIG. 3, etc.).

The memory may be one or more of many different types of memory. The various types of memory may store information in the form of software and data. The software may include the host operating system 141, application 103, and various other software applications. Main memory 504 may be, for example, ROM, flash memory, dynamic random-access memory (DRAM) such as synchronous DRAM (SDRAM), double data rate (DDR SDRAM), or DRAM (RDRAM), and so forth. Static memory 506 may be, for example, flash memory, static random-access memory (SRAM), and so forth.

The machine 500 may further include a network interface device 508, an alphanumeric input device 512 (e.g., a keyboard) that accepts input from a user, a cursor control device 514 (e.g., a mouse) that accepts input from a user, a signal generation device 516 (e.g., a speaker), and a display device 510. In an example, the client device 108 may provide via the input device 512 user input that causes the main container 140 to be created and the application 103 run inside the main container 140. In another example, the client device 108 may request the network interface device 508 for executing a workload of the application 103.

The display device 510 may be a physical display device that displays data processed by the machine 500. The physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display, or another type of display unit. The display may be physically attached to the machine 500 or separate from and physically coupled via a wired or wireless connection to the machine 500. In an example, the display device 510 is part of, and integrated into, the machine 500 (e.g., a screen of the computing system and/or the client device). The display device 510 may be sold with and attached to the computing system and/or the client device such that when a user views content via the computing system and/or the client device, the content is displayed on the display device 510. It will be appreciated that other physical display devices are contemplated, and that the various types named herein are not limiting.

The data storage device 518 may include a computer-readable storage medium that stores one or more sets of instructions (e.g., software) embodying any one or more of the methodologies or functions described herein. The instructions may also reside, completely or at least partially, within main memory 504 and/or within the CPU 502 during execution thereof by the machine 500. Additionally, the main memory 504 and the CPU 502 may also constitute computer-readable storage media. The instructions may further be transmitted or received over the network 110 via the network interface device 508. While the data storage device 518 is shown in an example to be a single medium, the term "data storage device" should be taken to include a single medium or multiple media (e.g., a centralized or distributed database, and/or associated caches and servers) that store the one or more sets of instructions. The term "computer-readable storage medium" may also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. The steps or actions are those causing physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change, and substitution is contemplated in the foregoing disclosure and in some instances, some features of the disclosure may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the disclosure disclosed herein.

We claim:

1. A method of running an application workload, comprising:
   detecting a request from a client for a hardware element for executing a workload of an application, the hardware element being abstracted by a node running on a host operating system, and the host operating system being devoid of a kernel driver that interfaces with the hardware element;
   allocating the hardware element for the workload to execute in a container, the container being on the node;
   loading, by the container, the kernel driver into the host operating system in response to detecting the request, wherein the kernel driver interfaces with the hardware element; and
   running, by the container, the workload inside the container using the hardware element.

2. The method of claim 1, wherein the hardware element is a graphics processing unit (GPU).

3. The method of claim 1, wherein the hardware element is a network interface card (NIC).

4. The method of claim 1, further comprising:
   determining whether the kernel driver has been loaded into the host operating system, wherein running the workload includes in response to a determination that the kernel driver has been loaded into the host operating system, running the workload.

5. The method of claim 4, further comprising:
   in response to a determination that the kernel driver has not been loaded into the host operating system, determining whether a repository local to the host operating system has an image of the kernel driver for a version of the host operating system.

6. The method of claim 5, further comprising:
   in response to a determination that the repository has the image of the kernel driver for the version of the host operating system, retrieving from the repository the image of the kernel driver, wherein loading the kernel driver includes loading the retrieved image into the host operating system.

7. The method of claim 5, wherein the hardware element is associated with a configuration map that specifies a name of the hardware element.

8. The method of claim 7, further comprising:
   in response to a determination that the repository does not have the image of the kernel driver for the version of the host operating system:
      fetching, based on a reference included in the configuration map, source code of the kernel driver;
      generating, based on a build of the source code of the kernel driver, an executable version of the kernel driver; and
      pushing the executable version of the kernel driver into the repository.

9. The method of claim 7, further comprising:
   in response to a determination that the repository does not have the image of the kernel driver for the version of the host operating system:
      fetching, based on a reference included in the configuration map, binary code of the kernel driver; and
      pushing the binary code of the kernel driver into the repository.

10. A system for running an application workload, comprising:
    a kernel driver support system that detects a request from a client for a hardware element for executing a workload of an application, wherein the hardware element uses a kernel driver to communicate with a host operating system and is abstracted by a node running on the host operating system;
    an orchestrator that creates a main container on the node and allocates the hardware element on which the workload executes;
    a privileged container that loads the kernel driver into the host operating system, wherein the privileged container runs inside the main container; and
    a workload container that runs the workload inside the workload container using the hardware element, wherein the workload container runs inside the main container,
    wherein a host machine includes a file system that is immutable, and the host machine includes the kernel driver support system, the orchestrator, the privileged container, and the workload container.

11. The system of claim 10, wherein the host operating system is a containerized operating system.

12. The system of claim 10, wherein the host operating system is a non-containerized operating system.

13. The system of claim 10, wherein the privileged container determines whether the kernel driver has been loaded into the host operating system, and wherein the workload container runs the workload in response to a determination that the kernel driver has been loaded into the host operating system.

14. The system of claim 13, wherein the privileged container determines whether a repository local to the system stores an image of the kernel driver that is compatible with a version of the host operating system in response to a determination that the kernel driver has not been loaded into the host operating system.

15. The system of claim 14, wherein in response to a determination that the repository stores the image of the kernel driver that is compatible with the version of the host operating system, the privileged container retrieves the image of the kernel driver from the repository.

16. The system of claim 14, wherein the hardware element is associated with a configuration map that specifies a name of the hardware element.

17. The system of claim 16, wherein in response to a determination that the repository does not store the image of the kernel driver, the privileged container fetches, based on a reference included in the configuration map, binary code of the kernel driver and pushes the binary code of the kernel driver into the repository.

18. The system of claim 16, wherein in response to a determination that the repository does not store the image of the kernel driver, the privileged container fetches, based on a reference included in the configuration map, source code of the kernel driver and builds the image of the kernel driver based on the source code.

19. The system of claim 18, wherein the privileged container pushes the image of the kernel driver into the repository.

20. A machine-readable medium comprising a plurality of machine-readable instructions that when executed by one or more processors is adapted to cause the one or more processors to perform a method comprising:
    detecting a request from a client for a hardware element for executing a workload of an application, the hardware element being abstracted by a node running on a host operating system;
    determining, based on the hardware element and a version of the host operating system, a kernel driver associated with the hardware element;

allocating the hardware element for the workload to execute in the container;
compiling, by the container, the kernel driver;
loading, by the container, the kernel driver into the host operating system; and
running, by the container, the workload inside the container using the hardware element.

* * * * *